Oct. 11, 1960

A. E. MURRAY 2,955,326

METHOD OF MAKING A MOLDED SHELL ADAPTED FOR USE IN
THE MANUFACTURE OF MOLDED SHOES

Filed Dec. 20, 1957

INVENTOR.
ALAN E. MURRAY

BY

*Eyre, Mann & Lucas*

ATTORNEYS

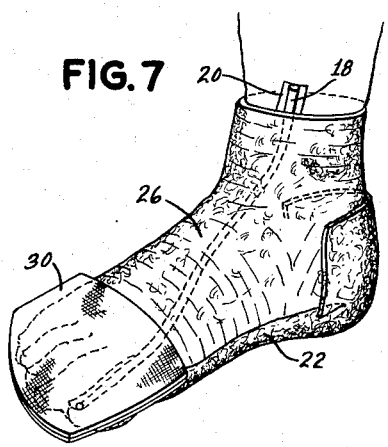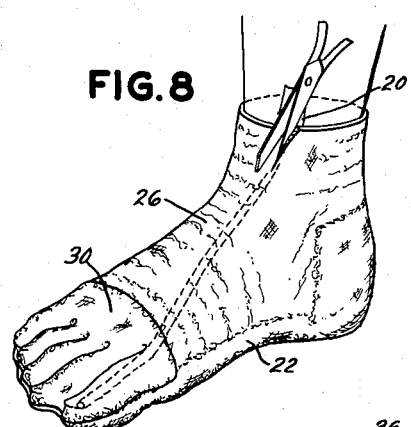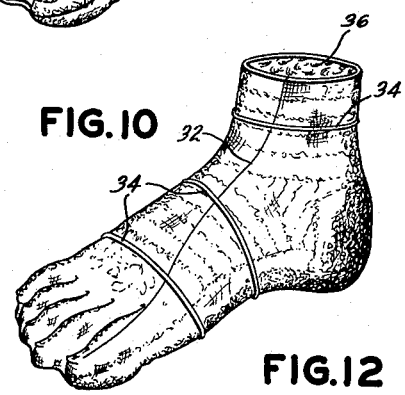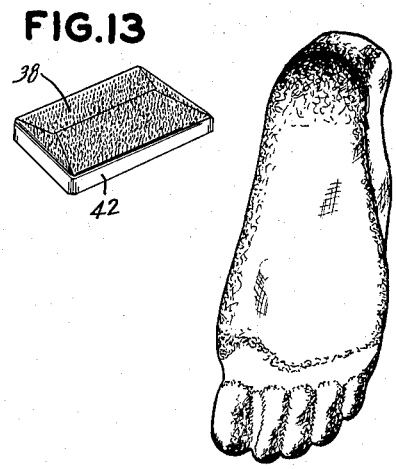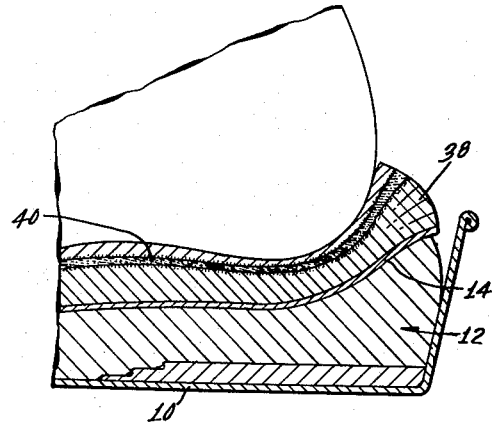
INVENTOR.
ALAN E. MURRAY
ATTORNEYS

United States Patent Office 2,955,326
Patented Oct. 11, 1960

2,955,326
METHOD OF MAKING A MOLDED SHELL ADAPTED FOR USE IN THE MANUFACTURE OF MOLDED SHOES

Alan E. Murray, 844 Colorado Ave., Bridgeport, Conn.

Filed Dec. 20, 1957, Ser. No. 704,170

15 Claims. (Cl. 18—55.05)

This invention relates to shoes molded to fit the individual contours of the feet and in particular to the manufacture of lasts used in making such molded shoes.

The manufacture of molded shoes of the type to which this invention relates was first suggested by me in United States Letters Patent No. 2,332,000. As there described a cast of the individual's feet is taken and then lasts are made upon which the shoes are built. The shoes are built by applying fabric and leather wet with liquid rubber latex in uncured form to the lasts and these materials are very carefully and exactly molded on the lasts so that the finished shoe faithfully follows the contours of the individual's feet.

Making a last of the individual's foot has proven to be a very difficult and expensive operation. First a cast is made by enveloping the foot with a mass of moldable material such as plaster of Paris and the foot must be very carefully maintained in a set position without moving while the plaster hardens. If the foot shifts to any appreciable extent the cast may be spoiled and in such case it has to be completely remade.

After the cast is formed it must be carefully removed from the foot and thereafter a last is made by pouring plaster of Paris into the cast. The entire operation is difficult to control and since the hardened plaster last is fragile it must be very carefully handled during subsequent processing.

So-called slipper casts made by wrapping the foot with plaster of Paris bandages even though quickly and easily made have not proven satisfactory for use in the manufacture of molded shoes. Wrapping the toes with plaster bandages tends to draw them together in a cramped position distorting the shape of the front of the foot and the taut wrappings do not capture any of the detail of the contours of the toes required in molded shoes. Pouring up the last in a plaster bandage cast is not easily done and the plaster bandage cast must be carefully reinforced so that it will retain its shape while the last is being poured.

In accordance with the present invention I have discovered an entirely new casting method which now makes it possible for the first time to form a hollow shoe last right in place on the foot in a single operation. The last is quickly and easily made preferably with plaster of Paris bandages and wrapping the foot is carefully controlled to preserve the delicate posture mechanism in the digital region of the metatarsal arch. To this end the wrapping is started back of the toes in a line across the ball of the foot and care is taken to avoid covering the cavity which lies in front of the ball of the foot under the toes.

After the foot is wrapped with plaster of Paris bandages separate splints of bandage are applied lengthwise along the bottom of the foot in such manner as to provide a margin extending out about one inch beyond the periphery of the foot. The margin is then molded up around the curved portion of the toes and foot. The bandage splints are carefully arranged so as not to overlap the top surface of the toes to any appreciable extent for in such case there would be a tendency to pull the toes together and distort the shape of the front of the foot in the digital region of the metatarsal arch. The foot is then pressed down into a cushioning material adapted to apply back pressure against the sides and bottom of the foot and the back pressure causes the plaster bandage to be pressed in against the foot so that the bandage will intimately conform to the contours thereof. While the foot is held pressed down in the cushioning material second separate splints of plaster bandage are applied lengthwise on top of the toes and the splints are made large enough to provide a margin of about an inch extending out beyond the sides and front of the foot. The splints over the top of the toes are then very carefully molded to fit the contours of the top of each separate toe and the margin is carefully molded down against the side of the foot and toes to overlap the splints previously applied to the bottom of the foot.

By applying loose plaster bandage splints lengthwise over the area of the toes without overlapping the bottom or top of the foot to any appreciable extent and by molding the plaster splints to the toes while held in a weight bearing condition, I find that the natural posture of the digital region of the metatarsal arch is preserved and faithfully reproduced in the last.

The foot with plaster last in place thereon is held pressed down in weight bearing condition against the cushioning material until the plaster has set and hardened sufficiently to capture the shape and contours of the foot and then the hollow last is slit down the front along the ridge line of the foot and out over the top of the big toe. The last is then removed from the foot. A molded shoe cannot yet be built up on the exterior of the hollow last because the volume of the shoe last is too large to provide a shoe that will fit the foot snugly enough to give positive containment while the foot is in action as in walking.

In working with this problem I found that the volume of the last can be very effectively reduced to provide the desired containment by cutting away a narrow strip of material along one or both sides of the slit which was used in removing the hollow last from the foot. After the material is cut away, adjacent edges of the resulting slot are gently forced together and held in place against each other by means of rubber bands or other suitable attachment means. Reduction of the volume of the last by drawing it together along the ridge line at the top of the foot does not appreciably disturb the natural weight bearing attitude or posture relationship of different parts of the foot since the overall effect is to merely shrink the volume down throughout the last. The volume of the hollow shell of the last may be reduced while the plaster is still flexible or it may be reduced after the plaster has hardened and set. If the plaster is hard the shell is dipped in water after the slot is made to soften the shell so that its volume may be reduced.

After the plaster of the hollow last has dried and set the rubber bands or other attachment means may be removed and then a molded shoe is built up on the last. This may be done as described in my issued U.S. Patent No. 2,332,000 or in any other desired manner. For best results I prefer to reinforce the last before the molded shoe is built up on it by pouring just enough plaster of Paris slurry into the last to coat the interior walls thereof. The wall coating may be made uniform by covering the top opening in the last with the hand so that the hollow last may be rapidly rotated to distribute the plaster slurry evenly over the interior walls thereof. If desired any other convenient means for reinforcing the hollow last may be employed.

Many outstanding advantages are achieved with the hollow last of my invention and foremost among these is the fact that molded shoes built up on the hollow last fit the foot quite snugly to give positive containment to the body of the foot and yet the natural weight bearing posture of the digital region of the metatarsal arch is substantially preserved. I believe this is due to two very important factors. One is the way in which the plaster bandages are molded to the toes without distorting the natural posture of the digital region of the metatarsal arch and secondly it is the result of the way in which the volume of the last is reduced without appreciably disturbing the inter-relationship of different parts of the foot. Another great advantage is that my hollow last is made in a single molding operation right on the foot itself and there is no need for subsequent molding in order to form a last which would only tend to add mistakes to those that occurred in the casting operation or multiply any mistakes previously made. My hollow last dries very quickly and has very little weight as compared to the heavy solid lasts ordinarily used. The last of my invention is easy to handle in shoe making processes.

These and other advantages of the hollow last of my invention may be readily understood by reference to the accompanying drawings which illustrate a preferred method of forming my last and in which:

Fig. 7 illustrates the way in which plaster of Paris bandage splints are molded to the top front portion of the foot.

Fig. 8 illustrates one way in which the foot last of my invention may be removed from the foot.

Fig. 9 illustrates the last of Fig. 8 in which a portion of the last has been cut away to reduce its volume.

Fig. 10 illustrates the finished foot last of my invention.

Fig. 11 is a bottom view of the last of Fig. 10.

Fig. 12 shows a modified form of cushioning material.

Fig. 13 illustrates one way of packaging the cushioning material of Fig. 12.

Figure 1:
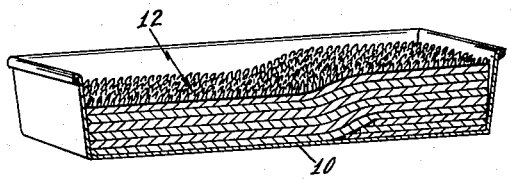
Fig. 1 is a front view of a form of cushioning material of my invention positioned in a pan. The pan is partially cut away to better illustrate the material.
Figure 2:
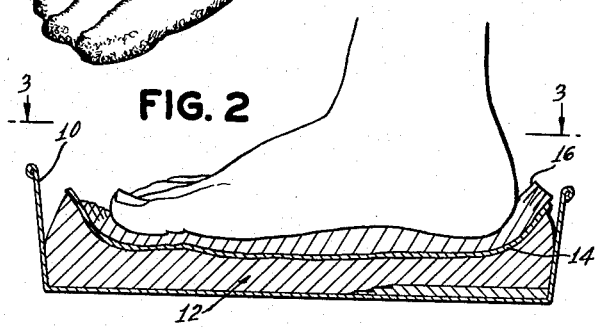
Fig. 2 illustrates the way in which the cushioning material may be molded by a foot.
Figure 3:
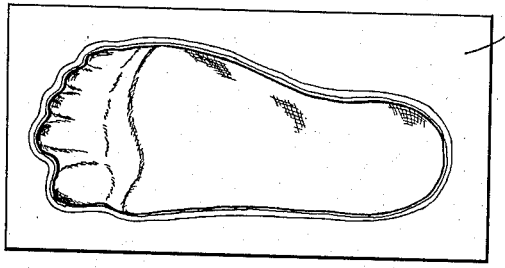
Fig. 3 is a top view of the cushioning material of Fig. 2 showing a foot impression molded in the material.

Referring now to Fig. 1 of the drawings, 10 is a suitable pan which provides about one to one and a half inch clearance around the individual's foot. In the pan a plurality of layers of dry terry cloth 12 are placed, nine such layers being shown in the drawings. The three bottom layers extend over only about one half the length of the pan. These bottom layers are staggered and provide the desired heel height for the foot. The top six layers of terry cloth are about the same size as the pan and these provide a laminated fabric pile adapted to take and maintain an impression of the foot therein. The foot is pressed down against the terry cloth cushion preferably in full weight bearing condition to form an impression of the foot therein (not shown). The foot is then removed and a sheet of Pliofilm 14 (Fig. 2) or other thin water proof separating sheet is placed on top of the dry terry cloth cushion. On top of this a plurality of layers of wet terry cloth 16 are placed, four such layers being shown in the drawing. The top terry cloth layers are most conveniently prepared by soaking three of them in water and then they are wrung out and applied on top of the Pliofilm sheet. A single dry layer of terry cloth is then placed over the three wet layers. The foot is now pressed down (Fig. 2) preferably under full body weight against the wet terry cloth layers to establish an impression of the foot in the wet terry cloth which coincides with the impression previously made in the layers of dry terry cloth. This arrangement of layers of wet and dry terry cloth forms an excellent cushioning medium for molding the bottom of my hollow plaster last (later described). The wet terry cloth readily molds itself to the bottom of the foot and the dry terry cloth provides the spring or back pressure against the wet layers forcing them into intimate contact with the sides and bottom of the foot and toes. The Pliofilm separating sheet keeps the bottom layers of terry cloth dry so that they retain their resilient springy characteristics. As a result the foot impression formed in the cushioning medium quite accurately captures the contours of the bottom of the foot and toes as illustrated in Fig. 3.

Figure 4:
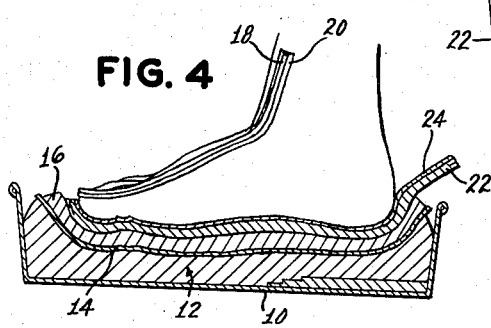
Fig. 4 illustrates the molding of plaster of Paris bandage splints positioned on the cushioning material of Fig. 2.

In order to prepare the foot for the plaster bandage wrap a cord preferably a rubber cord 18 about ⅛ inch in diameter is attached to the back of a strip of adhesive tape 20 by adhesive or other convenient means and the tape is then affixed to the foot (Fig. 4). The tape follows along the top of the big toe and then up along the ridge line at the top of the foot. The rubber cord provides a small ridge in the last so that the point of a pair of shears may be readily inserted into the last to cut it open to remove the foot.

Figure 5:
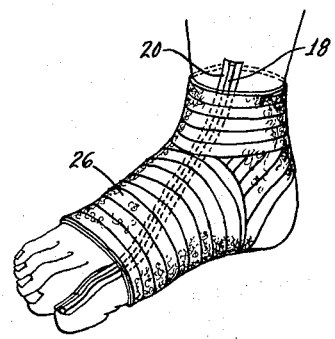
Fig. 5 shows a portion of the last of my invention in place on the foot.

Two plaster of Paris bandage splints 22 are trimmed to size to leave a margin of about one half to one inch at the sides and front of the foot and about three inches at the rear of the foot. The splints are soaked in water and then both are applied one on top of the other on the terry cloth cushion in the pan. The splints are covered with a water proof sheet of Pliofilm 24 (Fig. 4) and then the foot is again pressed down preferably in full weight bearing on top of the Pliofilm, care being taken to have the position of the foot coincide with the foot impression in the terry cushion. The foot impression in the terry cloth cushion molds the bottom of the splints to conform to the contours of the foot and at the same time the foot molds the top surface of the splints. The foot and Pliofilm sheet are carefully removed from the pan so as not to distort the molded splints and then the foot is wrapped with a plaster of Paris bandage 26 (Fig. 5).

The plaster of Paris bandage is first thoroughly wet with water and then wrapping is started at the ball of the foot just behind the digital region of the metatarsal arch so that the natural position of the toes and metatarsal arch in the digital region of the foot will not be disturbed. As best shown in Fig. 5, the plaster bandage wrap ends immediately above the ankle and the end of the wrap may be pasted down against the turns or fastened by any other convenient means. As shown in the drawings, the turns of the bandage are applied in a spiral in overlapping relationship in customary manner so that the skin will not bulge out between adjacent turns. During application the bandage strip is held taut so that the turns will fit snugly against the foot and after the wrap is completed it is pressed in firmly against the foot by hand. Some containment of the foot is achieved by keeping the wrap taut during application. Additional containment is achieved when the bandage shrinks as it sets and hardens. In this connection it will be understood that the word "containment" as used herein is intended to mean that the particular item referred to fits the foot so snugly that positive support is given to the tissue of the foot when held in weight bearing condition. Since most of the strain in removing the last from the foot centers in the area of the ball of the foot it is preferable to apply the first two turns of the wrap one on top of the other to give added strength in this area of the last.

Figure 6:
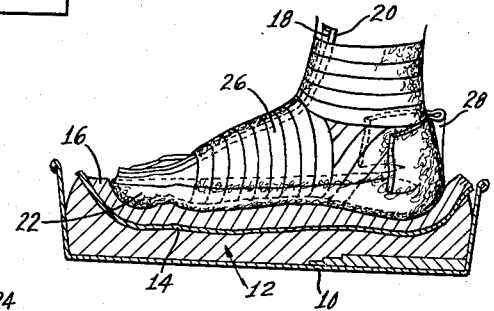
Fig. 6 illustrates the way in which the plaster of Paris bandage splints of Fig. 4 may be molded to the bottom of the foot.

After the wrap is completed the foot is again placed in weight bearing condition in the impression in the plaster splints in pan 10 (see Fig. 6). The margin of the splints is then carefully molded up against the plaster bandage wrap and up against the curved portion of each individual toe. Great care is taken in molding the plaster splints around the individual toes to avoid disturbing the natural position of the toes.

In molding the margin up against the back of the foot the plaster splint is gathered into a tuck 28 which takes care of the excess material and then after the splint is firmly pressed in place against the heel portion of the foot the tuck is cut off even with the surface of the plaster splint (Fig. 7). By molding the rear margin of the splint well up on the wrap added strength is given to the heel portion of the last.

After this is done two plaster of Paris bandage splints 30 are soaked in water and then both splints are applied lengthwise one on top of the other to cover the front of the plaster bandage wrap and the top of the toes. The splints are then carefully molded by hand to fit the contour of the top of the toes and the splints are pressed down into the gap between the toes. Care is taken not to disturb the natural weight bearing position of the toes and metatarsal arch. The two top splints are then trimmed to provide a margin of about one half to one inch extending out beyond the sides and front of the foot. The margin of the top splints is then carefully molded down in overlapping relation against the margin of the two bottom splints. This completes the molding of the hollow shell of the last which is now left on the foot until the plaster has hardened to the extent that it will retain the form of the foot therein. Best results are achieved by maintaining the foot in weight bearing condition on the cushioning material while the top splints are molded to the foot and while the plaster sets and hardens.

The rubber cord 18 is now removed from the last by pulling upwardly on the exposed end portion thereof and then the point of a pair of shears (Fig. 8) is inserted into the hollow left by the rubber cord and the last is cut down along the line of the rubber cord ending at the top of the big toe. The last is now gently spread apart and the foot is removed. In order to reduce the volume of the hollow last so that molded shoes made thereon will give adequate containment and positive support for the foot when in weight bearing condition a strip of material about ⅛ inch wide is cut out of the last on each side of the cut in the top portion of the last. After this is done the edges on each side of the slot are brought into edge to edge contact by hand and then rubber bands 34 are applied around the last to hold the adjoining edges of the slot against each other.

I have found that reduction of the volume of the last in this manner does not adversely affect the natural weight bearing attitude of the feet or natural posture relationship of the different parts of the foot and this is particularly true in the digital region of the metatarsal arch. This is of great advantage because the fit of the shoe across the digital region of the metatarsal arch is highly critical and it is important that the shoe does not disturb the posture of the arch as prescribed by nature. As shown in the drawings, I prefer to taper the amount of material cut out of the last down towards the big toe so that only a very small amount of material is removed in the area of the toes. This of course further reduces volume reduction in the area of toes and metatarsal arch and it tends to preserve the natural weight bearing posture in the arch.

After the plaster has set and hardened a molded shoe is built up on the exterior of the hollow last following the method described in my issued U.S. Patent No. 2,332,000 or by any other convenient method. For best results I prefer to strengthen the hollow plaster bandage last before the molded shoe is built up on the last. This is most conveniently done by pouring enough plaster of Paris slurry into the last to form a coating on the interior wall thereof. The coating 36 (Fig. 10) of plaster slurry may be evenly distributed over the interior wall of the last by placing the hand over the top opening whereupon the last is tipped in different directions to distribute the slurry and rapidly revolved in small circles to force the liquid slurry out against the interior wall of the last.

While I have described the details of a preferred form of my invention it will be obvious to those skilled in the art that certain changes and modifications may be made without departing from the spirit and scope of my invention.

For example, while the cushion made up of layers of wet and dry terry cloth makes an excellent medium for molding the bottom of the last to provide great detail therein other cushioning materials, fabric or otherwise may be employed for pressing the plaster bandages and splints up against the bottom of the foot. For example a mat of about six layers of dry terry cloth is a very good cushioning material. Other cushioning materials such as sponge rubber do not give the detail achieved with a terry cloth mat but still the resulting product would have some commercial utility. In the preferred form of invention a foot impression is first formed in the cushioning material and plaster splints are applied to the cushion and molded by foot before the bandage wrap is applied. This is not necessary and the plaster splints may be applied to the bottom of the foot after the bandage wrap is applied and then the foot may be pressed down into a cushioning material and molded without having first formed a foot impression in the cushioning material at all. In some cases depending upon the condition of the foot it may be desirable to press the foot down into the cushioning material with only a part of the body weight applied to the foot. In such case the individual remains seated while the foot and last is pressed down into the molding material. On the other hand if athletic shoes are desired for active sports or dancing, then only the front portion of the foot last is pressed down into the cushioning material with full or partial body weight applied solely to the ball of the foot all as described in my copending application Serial No. 621,226, now U.S. Patent No. 2,856,-633, filed November 9, 1956, and entitled Method of Taking Cast of Feet in Dynamic Position and Product Thereof. Or, if desired, the cushioning material may be placed on a spherical type support as described in my issued U.S. Patent No. 2,742,717.

A modified form of cushioning material is shown in Fig. 12. As there shown the cushioning material comprises a plurality of layers of fabric material 38 preferably terry cloth which include between at least the top two layers thereof a coating 40 of grease such as Vaseline. Best results are achieved by using four layers of fabric material with a layer of Vaseline between each of the fabric layers. The particular grease employed must have enough body at room temperature to provide a coating or layer between the layers of fabric. For this purpose coating 40 may be defined as a hydrocarbon base material which is a semisolid at ordinary room temperature. For example petrolatum, industrial greases, petroleum jelly, soft waxes or hydrocarbon emulsions used in cosmetic creams may be employed. The cushioning material of Fig. 12 is soft enough so that the foot readily sinks down into it and yet there is no tendency for the cushioning material to spread out and separate from the sides of the foot. As a result the cushion has hydraulic characteristics that tend to exert uniform pressure against the bottom and curved portion at the side of the foot. In acting like a hydraulic medium the cushioning material of Fig. 12 tends to preserve the natural posture of the foot in weight bearing condition especially in the digital region of the metatarsal arch and the fit of the molded shoes made on lasts molded in it are materially better than those formed on lasts molded in other types of cushioning material. Another advantage of the cushioning material of Fig. 12 is that the cushion may be packaged in a bag of Pliofilm 42 (Fig. 13) or other thin sheeted material and stored on the shelf ready for immediate use. The cushion may also be reused, it being only necessary to separate the individual layers to destroy the foot impression in the cushion and return it to its original condition ready for a second molding operation.

In describing the preferred form of my invention a plaster of Paris bandage and splints of the type sold on the open market have been employed. But other moldable materials such as synthetic resins, elastomers and like materials adapted to form a thin shell on the foot which will set and harden and capture a permanent impression of the foot therein could be employed. The moldable material may be used with or without a fabric reinforcing sheet. Fabric impregnated with liquid rubber latex can be employed. The finished hollow last in such case is thereafter strengthened so that it will stand up during the shoemaking process. A sock with open toe end portion starting at the line across the ball of the foot behind the toes may be used. The sock is impregnated with a suitable moldable material and the toe area is separately molded as described hereinabove.

As to the splints, the splints applied to the bottom of the foot need not extend all the way back under the ball of the foot and the splints may be cut off at any convenient length that overlaps the bandage wrap. If desired the marginal portions of the top and bottom splints need not be overlapped but may be pinched together to form a fin which is trimmed off after the plaster hardens. Other moldable materials may be used in place of the splints provided care is taken to avoid crowding the toes or disturbing the natural posture of the digital region of the metatarsal arch.

I have found that the cushioning material of Fig. 12 takes and maintains such an excellent impression of the bottom of the foot that this form of material may be used with great advantage in forming a positive cast of the bottom of the foot. In such case after an impression of the bottom of the foot is formed in the material, a plaster of Paris slurry is then poured into the impression and the plaster is allowed to remain therein until it has set and hardened to form a positive cast of the foot impression. The terry cloth fabric material is then removed from the plaster cast. The resulting positive solid plaster cast may be used as desired and I have found that it is particularly useful for making a shoe insert which is exactly contoured to the bottom of the foot. A shoe insert may be made up by applying a suitable moldable material to the bottom of the cast. For example a plurality of layers of terry cloth fabric material or leather impregnated with liquid rubber latex may be applied to the bottom of the cast. The material is carefully molded to the cast so that it will capture the detailed contours thereof and after the latex has cured the resulting platform is removed from the cast and then trimmed so that it will fit into an ordinary shoe and form an insole for the shoe. In those cases where it is extremely important to reproduce the contours at the front of the foot in the region of the metatarsal arch I prefer to use a relatively hard grease between the layers of fabric material in the area at the front of the foot.

Figure 14:
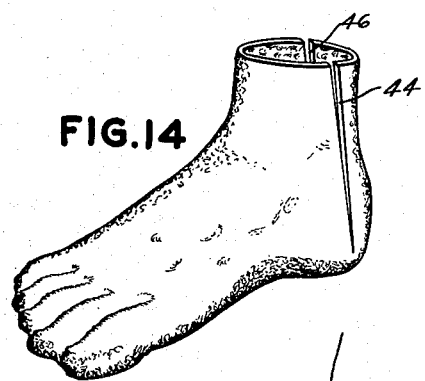
Fig. 14 illustrates another way of reducing the volume of the last of Fig. 8.

Reduction of the volume of the last is a highly critical and important step but the exact amount of reduction in volume will be determined by the condition of the feet, thickness of the shell of the last and purpose for which the shoes are to be used. For best results I remove about ⅛ to ½ inch from the wall of the last when the thickness of the shell of the last is about ¹⁄₁₆ of an inch. Otherwise a tape measure may be used to determine the actual measurements of the foot and sufficient material is then cut from the last to reduce its volume down to about ¹⁄₁₆ to ⅛ of an inch below actual measurement of the foot when suspended in air. Proper volume reduction for the condition of the feet and purpose for which the shoes are intended is a matter well within the judgment of one experienced in the custom shoe making art. While I prefer to cut a slot out of the front of the hollow last the volume may also be effectively reduced by positioning the slot in a different part of the upper. On the other hand more than one slot may be employed. For example in Fig. 14 the volume of the hollow last of Fig. 8 is reduced by means of two slots 44 and 46 respectively.

The rubber cord and tape provide convenient means for protecting the foot while the last is cut open to remove it from the foot. If care is taken in cutting the last open the protective cord and tape need not be used. Strengthening the hollow last for shoemaking may be done with any suitable material for such purpose.

In a copending application filed under even date herewith entitled Molded Shoe and Method of Making Same I describe the manufacture of molded shoes built on a last without any reduction of volume thereof. In such case volume reduction is provided for in the structure of of the shoe itself.

It will be understood that it is intended to cover all changes and modifications of the preferred form of invention herein chosen for the purpose of illustration which do not constitute departures from the spirit and scope of the invention.

What I claim is:

1. The method of molding a shoe to the foot which comprises the steps of applying a moldable material to the foot to form a hollow last, maintaining the moldable material in place on the foot until an impression of the foot is set in the material, cutting the top front wall of the last open in a line extending lengthwise down the top front wall from the rim at the opening in the top of the last to the area at the front adjacent to the toe portion thereof to remove the foot, removing the foot from the last, reducing the volume of the hollow last by removing a portion of the wall of the last adjacent the lengthwise cut in the top front wall of the last, thereafter bringing opposite edges on each side of the cut together to close the last and reduce its volume and then molding a shoe on the outside surface of the hollow last.

2. The method specified in claim 1 which includes the step of cutting the top front wall of the last open by slitting the wall along the ridge line at the front of the foot.

3. The method specified in claim 1 which includes the step of removing a strip of the wall of the last all the way along the entire length of the cut in order to reduce the volume of the hollow last.

4. The method specified in claim 1 which includes the steps of forming the last by wrapping the foot from a line across the ball of the foot behind the toes up to the ankle region with a wet plaster of Paris bandage and then applying separate strips of wet plaster of Paris bandage to the exposed portion of the top of the front of the foot and separate strips of wet plaster of Paris bandage to the exposed portion of the bottom of the foot to complete the hollow last.

5. The method specified in claim 4 which includes the step of pressing the bottom of the last down against a cushioning material while the moldable material is still capable of taking an impression of the foot therein whereby the bottom of the last is molded to conform to the contours of the bottom of the foot.

6. The method of making a shoe last adapted to have a shoe formed on the exterior surface thereof which comprises the steps of wrapping the foot with a wet plaster of Paris bandage, starting at a line across the ball of the foot behind the toes and continuing along the body of the foot up to the region of the ankle, applying a moldable material to the top and bottom surfaces of the toes and exposed portion at the front of the foot, molding the material to conform to the contours of the toes without disturbing the natural position of the toes and metatarsal arch in the digital region of the foot, pressing the bottom of the foot down in weight bearing condition against a cushioning material, maintaining the moldable material and plaster bandage wrap in place on the foot until it has set sufficiently to retain an impression of the foot therein, cutting the top front wall of the last open in a line that extends lengthwise down the top front wall from the rim at the opening in the top of the last to the area at the front adjacent to the toe portion thereof to remove the foot, removing the foot from the last and then removing a portion of the wall of the last adjacent the said lengthwise cut in the top front wall of the last and thereafter bringing opposite edges on each side of the cut together to close the last and reduce its volume.

7. The method of making a shoe last adapted to have a shoe formed on the exterior surface thereof which comprises the steps of wrapping the foot with a wet plaster of Paris bandage, starting at a line across the ball of the foot behind the toes and continuing along the body of the foot up to the region of the ankle, applying a wet plaster bandage splint to the bottom of the toes and exposed portion of the front of the foot, which provides a margin around the foot wide enough to extend up along the side of the foot and front of the toes to approximately the top thereof without overlapping the top of the toes or foot, molding the margin up against the side of the foot and front of each individual toe, applying a second wet plaster bandage splint to the top of the toes and exposed portion of the foot, which provides a margin around the foot wide enough to extend down to approximately the bottom of the foot without overlapping the bottom surface thereof, molding said second splint against the foot and in and around each individual toe in overlapping relationship with the plaster splint on the bottom of the foot, pressing the bottom of the foot down in weight bearing condition against a cushioning material, maintaining the moldable material and plaster bandage wrap in place on the foot until it has set sufficiently to retain an impression of the foot therein, cutting the top front wall of the last open to remove the foot, removing the foot from the last and then removing a portion of the wall of the last adjacent the said cut and thereafter bringing opposite edges on each side of the cut together to close the last and reduce its volume.

8. The method specified in claim 7 which includes the step of forming the cushioning material by placing a plurality of layers of terry cloth fabric material one on top of the other in a laminated pile.

9. The method specified in claim 7 which includes the steps of forming the cushioning material by placing a plurality of layers of dry terry cloth material one on top of the other in a laminated pile, placing a sheet of waterproof material on top of said pile and then placing a plurality of wet layers of terry cloth fabric material one on top of the other over said sheet of separating material and then placing a dry strip of terry cloth fabric material on the top of said laminated pile.

10. The method of making a shoe last adapted to have a shoe formed on the exterior surface thereof which comprises placing a plurality of strips of dry terry cloth fabric material one on top of the other to form a laminated pile on a support, placing the foot on the top of said pile in weight bearing condition to form an impression of the foot in such pile, applying a sheet of waterproof material over the top of said pile, placing a plurality of strips of wet terry cloth fabric material on said separating material, placing a strip of dry terry cloth material on the top of said pile, pressing the foot down on the top of the pile in weight bearing condition to form an impression of the foot in said pile which corresponds to the foot impression positioned in the plurality of dry layers of terry cloth fabric material, thereafter placing a plurality of wet plaster bandage splints over said foot impression which splints overlap the periphery of said foot impression to provide a margin around the foot wide enough to extend up along the side of the foot and front of the toes to approximately the top thereof without overlapping the top of the toes or foot, applying a separating sheet to the top of said splints, placing the foot on top of said separating sheet and then applying body weight to the foot to press it down into the foot impression in said terry cloth pile, removing the foot and sheet of separating material from said pile, wrapping the foot with a wet plaster of Paris bandage starting at a line across the ball of the foot behind the toes and continuing along the body of the foot up to the region of the angle, placing the wrapped foot back on the splints in the foot impression in said terry cloth pile, molding the margin of said plaster bandage splints up against the side of the foot and front of each individual toe, applying a second wet plaster bandage splint to the top of the toes and exposed portion of the foot, which is large enough to provide a margin around the foot wide enough to extend down to approximately the bottom of the foot without overlapping the bottom surface thereof, molding said second splint against the foot and in and around each individual toe in overlapping relationship with the plaster splint on the bottom of the foot, pressing the bottom of the foot down in weight bearing condition against a cushioning material, and then maintaining the foot in the impression in said pile until the plaster bandage wrap and splints have set sufficiently to retain an impression of the foot therein, thereafter cutting the top front wall of the last open along the ridge line of the front of the foot down to the tip of the big toe, removing the foot from the last, cutting away a strip of material adjacent the cut which extends throughout the length of said cut, thereafter bringing opposite edges on each side of the cut together to close the last and reduce its volume.

11. The method specified in claim 10 which includes the steps of applying a cord to one side of a tape, said cord and tape being long enough to reach from the tip of the toe up along the front of the foot opposite the ankle region thereof, and then before the plaster bandage wrap is applied to the foot placing the tape in position against the foot to extend from the tip of the toe up along the ridge line at the top of the foot up to the ankle region thereof with the cord in position on the exterior surface of said tape.

12. The method of making a shoe last adapted to have a shoe formed on the exterior surface thereof which comprises the steps of applying a moldable material to the foot, maintaining the moldable material in place on the foot until an impression of the foot is set in the material, cutting the wall of the last open in a line extending from the rim of the opening in the top of the last down to the area in the wall positioned above but adjacent to the bottom sole portion of the last to remove the foot, removing the foot from the last, reducing the volume of the last by removing a portion of the wall of the last adjacent the cut, and then moving opposite edges on each side of the cut towards each other to reduce the volume of the last.

13. The method specified in claim 12 which includes the step of cutting the top front wall of the last open along the ridge line of the front of the foot.

14. The method specified in claim 12 which includes the step of moving opposite edges on each side of the cut into face to face contact to close the last and reduce its volume.

15. The method of manufacturing a hollow molded shell adapted for use in the manufacture of molded shoes which comprises the steps of applying a moldable material to the foot to form a hollow shell thereon, maintaining the moldable material in place on the foot until an impression of the foot is set in the material, cutting the top front wall of the shell open in a line that extends down from the rim of the opening in the top of the shell to the area at the front of the shell adjacent to the toe portion thereof to remove the foot, removing the foot from the molded shell, reducing the volume of the shell by removing a portion of the wall of the shell adjacent the cut, thereafter bringing opposite edges on each side of the cut together to close the shell and reduce its volume.

References Cited in the file of this patent

UNITED STATES PATENTS

| | | |
|---|---|---|
| 1,241,853 | Jury | Oct. 2, 1917 |
| 1,245,268 | Price | Nov. 6, 1917 |
| 1,647,639 | Larson | Nov. 1, 1927 |
| 2,565,758 | Covino | Aug. 28, 1951 |
| 2,568,292 | Murray | Sept. 18, 1951 |
| 2,668,304 | Murray | Feb. 9, 1954 |

OTHER REFERENCES

Wilson article, The Journal of Bone & Joint Surgery, vol. XXIII, No. 1, January 1941, pages 184–186. (Copy in Div. 15, Anatomical Dig.)